US011366828B1

(12) United States Patent
Srikantan et al.

(10) Patent No.: US 11,366,828 B1
(45) Date of Patent: Jun. 21, 2022

(54) REPLICATION VALIDATION

(71) Applicant: Cisco Technology, Inc., San Jose, CA (US)

(72) Inventors: Geetha Srikantan, Palo Alto, CA (US); Deivapalan Perumal Govindan, Tamil Nadu (IN); Gauri Behera, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 16/691,391

(22) Filed: Nov. 21, 2019

Related U.S. Application Data

(60) Provisional application No. 62/914,935, filed on Oct. 14, 2019.

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC .............................. G06F 16/27; G06F 16/2365
See application file for complete search history.

(56) References Cited

U.S. PATENT DOCUMENTS

2005/0076145 A1* 4/2005 Ben-Zvi ............ H04L 29/12018
709/245

OTHER PUBLICATIONS

Oracle Fusion Middleware Using Clusters for Oracle Weblogic Server 12c Release 1 (Jan. 1, 2012) Section 6, pp. 1-24, Jan. (Year: 2012).*
Cisco Expressway Cluster Creation and Maintenance Deployment Guide Cisco Expressway X8.6, pp. 1-40, Jul. (Year: 2015).*

* cited by examiner

*Primary Examiner* — Albert M Phillips, III
(74) *Attorney, Agent, or Firm* — Lee & Hayes, P.C.

(57) ABSTRACT

This disclosure describes techniques for validating a replication network. Validation of a replication network may include checking connectivity among components of the replication network, such as paired clusters. The techniques include performing intra-cluster and inter-cluster replication validation checks. The replication validation checks may generate replication validation output. Based at least in part of the replication validation output, user interface data may be sent to a display device for presentation to a user. In this way, connectivity faults within the replication network may be resolved.

20 Claims, 11 Drawing Sheets

OUTPUT 200

COLUMN 1

```
{
"jobid": "35110e76-81d6-4df9-98ee-1dfb8eb5dadc",
"state": "ERROR",
"timeSubmittedMillis": 1563358580912,
"timeStartedMillis": 1563358580944,
"timeElapsedMillis": 236149,
"jobSteps": [
{
"uuid": "ucsblr924cip-ucsblr927",
"type": "NODE",
"step": [
{
```

202 {
```
"name": "Checking for Dr Network IPTable entry from
         node mgmt IP 10.20.2.193",
"state": "SUCCEEDED",
"description": "iptable entry matched",
"entityUuid": "ucsblr924cip-ucsblr927",
"entityType": "NODE",
"completion": 0,
"isValidation": false
},
{
```

204 {
```
"name": "Checking for Dr Pairing IPTable entry from
         node mgmt IP 10.20.2.193",
"state": "SUCCEEDED",
"description": "iptable entry matched",
"entityUuid": "ucsblr924cip-ucsblr927",
"entityType": "NODE",
"completion": 0,
"isValidation": false
},
{
"name": "Checking 10.33.64.123 from 10.33.64.119",
"state": "SUCCEEDED",
"description": "no packet loss",
"entityUuid": "ucsblr924cip-ucsblr927",
"entityType": "NODE",
"completion": 0,
"isValidation": false
},
{
"name": "Checking 10.33.64.124 from 10.33.64.119",
"state": "SUCCEEDED",
"description": "no packet loss",
"entityUuid": "ucsblr924cip-ucsblr927",
"entityType": "NODE",
"completion": 0,
"isValidation": false
},
{
"name": "Checking 10.33.64.122 from 10.33.64.119",
"state": "SUCCEEDED",
"description": "no packet loss",
"entityUuid": "ucsblr924cip-ucsblr927",
"entityType": "NODE",
"completion": 0,
"isValidation": false
},
{
"name": "Summary",
"state": "SUCCEEDED",
"description": "Summary Step",
"entityUuid": "ucsblr924cip-ucsblr927",
"entityType": "NODE",
"completion": 0,
"isValidation": false
```

COLUMN 2

```
}
]
},
{
"uuid": "ucsblr924cip-ucsblr925",
"type": "NODE",
"step": [
{
"name": "Checking for Dr Network IPTable entry from
         node mgmt IP 10.20.2.191",
"state": "SUCCEEDED",
"description": "iptable entry matched",
"entityUuid": "ucsblr924cip-ucsblr925",
"entityType": "NODE",
"completion": 0,
"isValidation": false
},
{
"name": "Checking for Dr Pairing IPTable entry from
         node mgmt IP 10.20.2.191",
"state": "SUCCEEDED",
"description": "iptable entry matched",
"entityUuid": "ucsblr924cip-ucsblr925",
"entityType": "NODE",
"completion": 0,
"isValidation": false
},
{
```

206 {
```
"name": "Checking 10.33.64.123 from 10.33.64.118",
"state": "FAILED",
"description": "100% packet loss",
"entityUuid": "ucsblr924cip-ucsblr925",
"entityType": "NODE",
"completion": 0,
"isValidation": false
},
{
"name": "Checking 10.33.64.124 from 10.33.64.118",
"state": "SUCCEEDED",
"description": "no packet loss",
"entityUuid": "ucsblr924cip-ucsblr925",
"entityType": "NODE",
"completion": 0,
"isValidation": false
},
{
"name": "Checking 10.33.64.122 from 10.33.64.118",
"state": "SUCCEEDED",
"description": "no packet loss",
"entityUuid": "ucsblr924cip-ucsblr925",
"entityType": "NODE",
"completion": 0,
"isValidation": false
},
{
"name": "Summary",
"state": "FAILED",
"description": "Summary Step",
"entityUuid": "ucsblr924cip-ucsblr925",
"entityType": "NODE",
"completion": 0,
"isValidation": false
}
]
},
{
```

FIG. 2A

OUTPUT 200

COLUMN 3

```
"uuid": "ucsblr924cip-ucsblr925",
"type": "NODE",
"step"
"uuid": "35110e76-81d6-4df9-98ee-1dfb8eb5dadc",
"name": "REPLICATION PAIR NETWORK CHECK",
"type": "UNKNOWN",
"step": [
{
"name": "Test Replication Network (Direction: From
Local, MTU: 1500)",
"state": "FAILED",
"description": "Failed",
"entityName": "REPLICATION PAIR NETWORK
CHECK",
"entityUuid": "35110e76-81d6-4df9-98ee-
1dfb8eb5dadc",
"entityType": "UNKNOWN",
"completion": 10,
"isValidation": false
},
{
"name": "Summary",
"state": "FAILED",
"description": "Summary Step",
"entityName": "REPLICATION PAIR NETWORK
CHECK",
"entityUuid": "35110e76-81d6-4df9-98ee-
1dfb8eb5dadc",
"entityType": "UNKNOWN",
"completion": 0,
"isValidation": false
}
]
},
{
"uuid": "ucsblr924cip-ucsblr926",
"type": "NODE",
"step": [
{
"name": "Checking for Dr Network IPTable entry from
         node mgmt IP 10.20.2.192",
"state": "SUCCEEDED",
"description": "iptable entry matched",
"entityUuid": "ucsblr924cip-ucsblr926",
"entityType": "NODE",
"completion": 0,
"isValidation": false
},
{
"name": "Checking for Dr Pairing IPTable entry from
         node mgmt IP 10.20.2.192",
"state": "SUCCEEDED",
"description": "iptable entry matched",
"entityUuid": "ucsblr924cip-ucsblr926",
"entityType": "NODE",
"completion": 0,
"isValidation": false
},
{
"name": "Checking 10.33.64.123 from 10.33.64.117",
"state": "SUCCEEDED",
"description": "no packet loss",
"entityUuid": "ucsblr924cip-ucsblr926",
"entityType": "NODE",
"completion": 0,
"isValidation": false
},
{
```

COLUMN 4

```
"name": "Checking 10.33.64.124 from 10.33.64.117",
"state": "SUCCEEDED",
"description": "no packet loss",
"entityUuid": "ucsblr924cip-ucsblr926",
"entityType": "NODE",
"completion": 0,
"isValidation": false
},
{
"uuid": "ucsblr924cip-ucsblr925",
"type": "NODE",
"step"
"uuid": "35110e76-81d6-4df9-98ee-1dfb8eb5dadc",
"name": "REPLICATION PAIR NETWORK CHECK",
"type": "UNKNOWN",
"step": [
{
"name": "Test Replication Network (Direction: From
         Local, MTU: 1500)",
"state": "FAILED",
"description": "Failed",
"entityName": "REPLICATION PAIR NETWORK
         CHECK",
"entityUuid": "35110e76-81d6-4df9-98ee
         1dfb8eb5dadc",
"entityType": "UNKNOWN",
"completion": 10,
"isValidation": false
},
{
"name": "Summary",
"state": "FAILED",
"description": "Summary Step",
"entityName": "REPLICATION PAIR NETWORK
         CHECK",
"entityUuid": "35110e76-81d6-4df9-98ee-
         1dfb8eb5dadc",
"entityType": "UNKNOWN",
"completion": 0,
"isValidation": false
}
]
},
{
"uuid": "ucsblr924cip-ucsblr926",
"type": "NODE",
"step": [
{
"name": "Checking for Dr Network IPTable entry from
         node mgmt IP 10.20.2.192",
"state": "SUCCEEDED",
"description": "iptable entry matched",
"entityUuid": "ucsblr924cip-ucsblr926",
"entityType": "NODE",
"completion": 0,
"isValidation": false
},
{
"name": "Checking for Dr Pairing IPTable entry from
         node mgmt IP 10.20.2.192",
"state": "SUCCEEDED",
"description": "iptable entry matched",
"entityUuid": "ucsblr924cip-ucsblr926",
"entityType": "NODE",
"completion": 0,
"isValidation": false
},
{
```

FIG. 2B

OUTPUT 200

COLUMN 5

```
"name": "Checking 10.33.64.123 from 10.33.64.117",
"state": "SUCCEEDED",
"description": "no packet loss",
"entityUuid": "ucsblr924cip-ucsblr926",
"entityType": "NODE",
"completion": 0,
"isValidation": false
},
{
"name": "Checking 10.33.64.124 from 10.33.64.117",
"state": "SUCCEEDED",
"description": "no packet loss",
"entityUuid": "ucsblr924cip-ucsblr926",
"entityType": "NODE",
"completion": 0,
"isValidation": false
},
{
"name": "Checking 10.33.64.122 from 10.33.64.117",
"state": "SUCCEEDED",
"description": "no packet loss",
"entityUuid": "ucsblr924cip-ucsblr926",
"entityType": "NODE",
"completion": 0,
"isValidation": false
},
{
"name": "Summary",
"state": "SUCCEEDED",
"description": "Summary Step",
"entityUuid": "ucsblr924cip-ucsblr926",
"entityType": "NODE",
"completion": 0,
"isValidation": false
}
]
},
{
"uuid": "ucsblr924cip",
"type": "NODE",
"step": [
{
"name": "Validate 0",
"state": "SUCCEEDED",
"description": "Paired and Peer Gateway 10.33.64.1
        reachable from 10.33.64.118.",
"entityUuid": "ucsblr924cip",
"entityType": "NODE",
"completion": 0,
"isValidation": false
},
{
"name": "Validate 1",
"state": "SUCCEEDED",
"description": "Local Cluster Replication Network is
        valid.",
"entityUuid": "ucsblr924cip",
"entityType": "NODE",
"completion": 0,
"isValidation": false
},
{
```

COLUMN 6

```
"name": "Validate 2",
"state": "SUCCEEDED",
"description": "Peer Cluster Replication Cluster IP
        10.33.64.121 reachable from 10.33.64.118.",
"entityUuid": "ucsblr924cip",
"entityType": "NODE",
"completion": 0,
"isValidation": false
},
{
"name": "Summary",
"state": "SUCCEEDED",
"description": "Summary Step",
"entityUuid": "ucsblr924cip",
"entityType": "NODE",
"completion": 0,
"isValidation": false
}
]
}
],
"percentComplete": 10,
"summaryStepState": "FAILED",
"lcMessage": "Replication Pair Network Check:
        Repl-Pair",
"category":
"DR_REPLICATION_PAIR_NETWORK_CHECK",
"links": [
{
"href": "/coreapi/v1/clusters/jobs/35110e76-81d6-4df9
        -98ee-1dfb8eb5dadc",
"rel": "JobStatus",
"method": "GET",
"comments": "Get Job status"
}
]
}
Response Code
200
```

FIG. 2C

REPLICATION VALIDATION

RELATED APPLICATIONS

This application claims priority to U.S. Provisional Patent Application No. 62/914,935, filed on Oct. 14, 2019, the entire contents of which are incorporated herein by reference.

TECHNICAL FIELD

The present disclosure relates generally to solutions for data protection, business continuity, and disaster recovery.

BACKGROUND

Network computation environments are improved when considerations have been developed toward business continuity and disaster recovery to handle unforeseen events. Business continuity and disaster recovery may be accomplished by replicating virtual workloads, associated Virtual Machine (VM) data, metadata, and/or configurations from one cluster to another. For instance, a replica of any given VM may be saved and/or recovered at the other (peer) cluster. A pre-requisite for such multi-cluster operations is to establish bi-directional communication between potentially all nodes of one cluster with potentially all nodes of the peer cluster. That is, a many-to-many topology is needed, with respect to connectivity. However, the huge variability in network environments may make the communication among network components difficult. The variable features within corporate network environments can include variable Maximum Transmission Unit (MTU) values, tunneling (encapsulating one network protocol within a different one), firewall rules, and/or issues with different gateways and VLANs, for example. Therefore, to help ensure smooth network communication for business continuity and disaster recovery efforts, techniques for validating replication networks are needed. In particular, business continuity and disaster recovery would benefit from replication validation techniques that are robust themselves to the same variability issues within network environments that can hamper network communication.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIGS. 2A-2C illustrate example replication validation outputs as JavaScript Object Notation (JSON) text, in accordance with the present concepts.

DESCRIPTION OF EXAMPLE EMBODIMENTS

Overview

Figure 1:
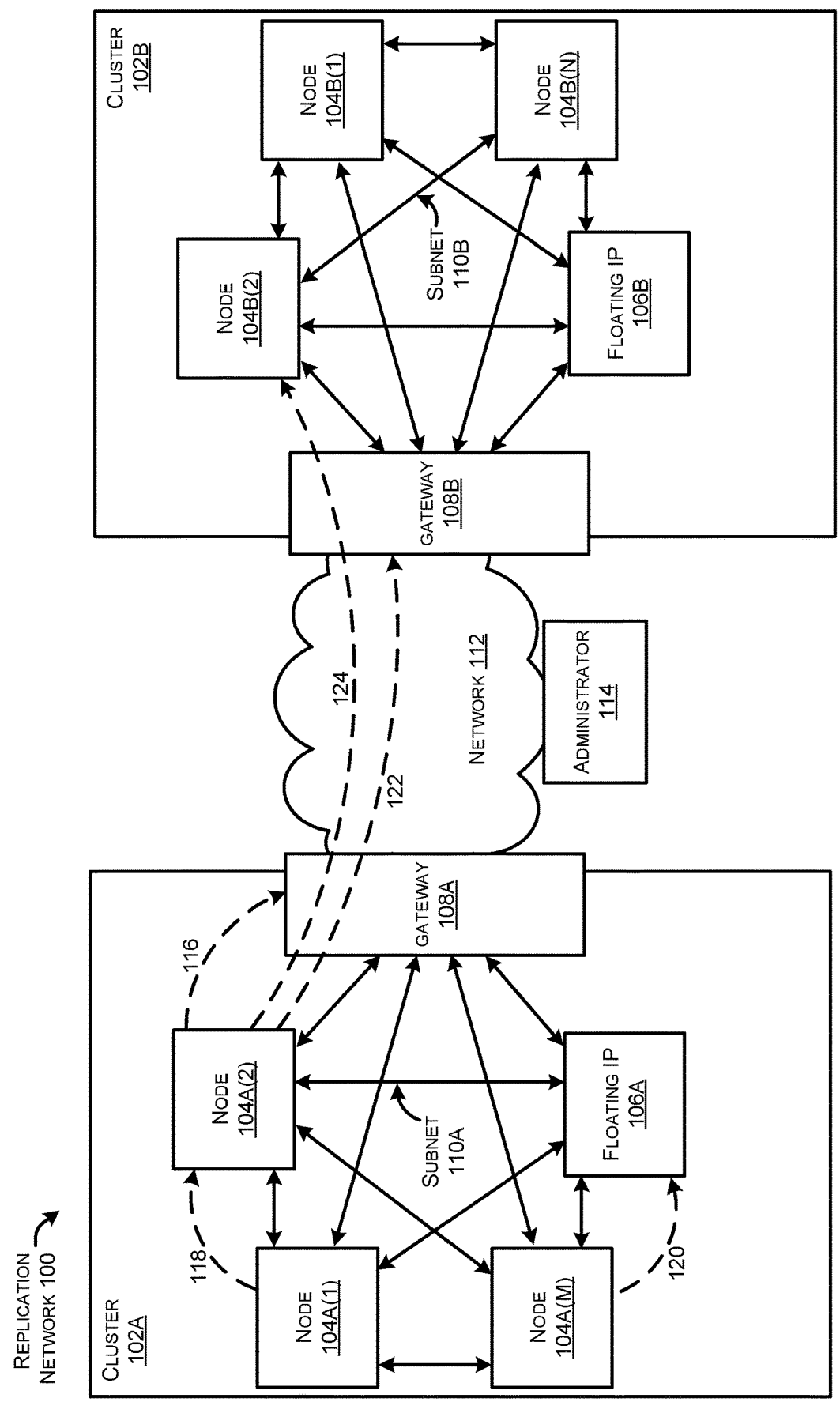
FIGS. 1 and 5 illustrate component diagrams with example replication networks that can be used to implement replication validation, in accordance with the present concepts.

This disclosure describes a method for performing replication validation checks among components of a replication network. The method includes performing replication validation checks among first nodes of a first cluster, from the first nodes of the first cluster to a first gateway of the first cluster, among second nodes of a second cluster, from the second nodes of the second cluster to a second gateway of the second cluster, from the first nodes to the second gateway, from the first nodes to the second nodes, from the second nodes to the first gateway, and from the second nodes to the first nodes. The method includes generating replication validation output from the replication validation checks among the components of the replication network. The method also includes sending user interface data to a display device for presentation to a user, where the user interface data is based at least in part on the replication validation output.

Additionally, the techniques described herein may be performed by a system and/or device having non-transitory computer-readable media storing computer-executable instructions that, when executed by one or more processors, performs the method described above.

Example Embodiments

This disclosure describes techniques for validating a replication network. In multi-site and/or multi-cluster environments, a replication network may be used to back-up information from one site (or cluster) to another. Before, during, and after the creation of the replication network, replication validation may be used to check connectivity and/or ensure that communication between the sites (or clusters) is proceeding. In some implementations, replication validation may include performing diagnostics on replication network components, configuration, and/or connections. Replication validation may also include presenting replication validation results to a user in an easily interpretable and actionable form. As such, replication validation can check the deployment of a replication network, and signal any problem to a user, so that the user may take action to fix the problem(s). In some implementations, replication validation may be viewed as fault detection in data protection environments.

In some cases, the challenges in establishing bi-directional communication between clusters are due to the diverse environments in which replication network deployments happen. Connectivity faults can be related to a variety of variables, such as incorrect internet protocol (IP) address and/or subnet information, cluster misconfiguration, corporate firewall rules, and other network elements external to the cluster (e.g., the network link, presence of tunneling, VLAN structure issues, network topology, etc.). In order to triage any of these scenarios, connectivity needs to be validated between clusters in an easy way, regardless of how many nodes are in any given cluster. Also, replication validation reporting would ideally include a set of connectivity faults encountered in each case, and the reporting would be presented to a user. The intra- and inter-cluster replication validation techniques herein were invented for this purpose.

Furthermore, replication validation and/or fault resolution may be more efficient where fault detection in a replication network is directed toward root causes of connectivity faults. For example, connectivity faults between nodes within a cluster (e.g., intra-cluster) may be a higher priority to resolve than connectivity faults between two clusters (e.g., inter-cluster). For instance, solving a connectivity fault related to a data communication from one cluster to another cluster may be irrelevant where the data communication is unable to find a way out of the first cluster in the first place. Therefore, once cluster pairing is established, detection of early disturbances in connectivity may be vital.

However, root causes of connectivity faults may not be obvious. Failure data related to a connectivity fault may be overwritten (or otherwise lost) due to adjacent or subsequent faults, for example. Loss of failure data can delay or prevent fault analysis, including root cause analysis. For this reason, capturing failure data, especially related to early failures, may be crucial information for efficient fault analysis. In some cases, the replication validation techniques presented herein may capture failure data, and potentially the first failure data, related to connectivity issues in replication networks.

FIG. 1 illustrates an example replication network 100 in accordance with the present replication validation concepts. As shown in FIG. 1, replication network 100 includes clusters 102, which may include nodes 104, a floating internet protocol (IP) 106, and/or a gateway 108. FIG. 1 also depicts subnets 110, a network 112, and an administrator 114.

As shown in FIG. 1, each of the clusters 102 may have multiple nodes 104. For example, cluster 102A is shown with nodes 104A(1), 104A(2), and 104A(M), indicating "M" number of nodes 104A. Cluster 102B is shown with nodes 104B(1), 104B(2), and 104B(N), indicating "N" number of nodes 104B. The use of "M" and/or "N" may indicate a same number or a different number of nodes 104 in a cluster 102, and is not meant to be limiting. The nodes 104 may be manifest as servers, hosts, and/or other computing devices. Referring to cluster 102A, note that a number of IP addresses used for the replication network may be M+1, where M IP addresses correspond to nodes 104A, and the "+1" IP address corresponds to the floating IP 106. Similarly, cluster 102B may have N+1 associated IP addresses. In some cases, the replication network may also include a virtual local area network (vLAN). A more detailed example replication network will be shown and described below relative to FIG. 5.

In some implementations, replication networks may include subnets 110 within clusters 102. Replication networks may be created to isolate intra-cluster replication traffic from other traffic within each cluster. The isolation of intra-cluster replication traffic (and/or inter-cluster replication traffic) may be accomplished via subnets 110. For example, as shown in FIG. 1, subnet 110A is represented by double-ended arrows extending between the nodes 104A, floating IP 106A, and gateway 108A of cluster 102A. The subnets 110 can represent communicative coupling between the elements within the cluster 102. Additionally, cluster 102A may be communicatively coupled to cluster 102B via network 112. Network 112 may be manifest as a local network, a wide area network (WAN), a cloud computing network, and/or a corporate network, for example. In the example shown in FIG. 1, clusters 102 may access network 112 via gateways 108. Gateways 108 may be manifest as switches, network access devices (NADs), and/or other types of computing devices. Other versions of communicative coupling between clusters is contemplated, including versions that do not include gateways. For instance, some paired clusters may include multiple nodes and a floating IP, and the clusters may be communicatively coupled with each other without a gateway-type device.

In some examples, administrator 114 may be involved in replication validation activities related to clusters 102. For example, administrator 114 may be responsible for initiating replication validation checks, collecting data or other information from replication validation activities, generating replication validation output, and/or causing replication validation output to be surfaced for a user. In some instances, administrator 114 may initiate replication validation activities based on input received from a user. The user input may relate to a specific replication validation check or more general replication validation activity. Administrator 114 may determine whether previously initiated replication validation activity is in progress before initiating new replication validation activity. In other examples, another component of a replication network may be responsible for the actions listed above. For instance, an element within a cluster may perform various replication validation techniques.

In the example shown in FIG. 1, several intra-cluster replication validation checks are represented by dashed arrows numbered 116, 118, and 120. For instance, arrow 116 can represent a replication validation check from node 104A(2) to gateway 108A, in other words a node-to-gateway replication validation check. The replication validation check may be a "ping" from node 104A(2) to gateway 108A to check connectivity, for instance. Similarly, arrow 118 can represent a replication validation check from node 104A(1) to node 104A(2), in other words a node-to-node replication validation check, and arrow 120 can represent a replication validation check from node 104A(M) to floating IP 106A, in other words a node-to-floating IP replication validation check. Note that additional replication validation checks may be made between other components within cluster 102A (e.g., a node-to-gateway replication validation check from node 104A(1) to gateway 108A). Also, the intra-cluster replication validation checks described above may be made within cluster 102B. However, only one example from each category of replication validation check is shown to avoid clutter on the drawing page. In some examples, a node-to-gateway replication validation check may be made as follows, where the IP address of the gateway is 10.30.0.1:

$ ping -I eth2 10.30.0.1

The example node-to-gateway replication validation check shown above is provided for illustration purposes and is not meant to be limiting. Other forms of replication validation checks are contemplated, including other interface names (e.g., eth2), etc. Replication validations checks may also be made inter-cluster, such as from cluster 102A to cluster 102B, and vice versa. As shown in FIG. 1, inter-cluster validation checks may be represented by arrows 122 and 124. At arrow 122, node 104A(2) can ping gateway 108B. In some examples, such an inter-cluster node-to-gateway replication validation check may be made as follows, where the IP address of the gateway of the "other" cluster is 10.45.0.1:

$ ping -I eth2 10.45.0.1

At arrow 124, node 104A(2) can ping node 104B(2). Again, only one example inter-cluster node-to-gateway replication validation check and one example inter-cluster node-to-node replication validation check are shown to avoid clutter on the drawing page. Although "ping" is used in the description, the actual mechanism of a replication validation check may vary. For instance, a ping (based on ICMP protocol) may be blocked by firewalls. Therefore, in some cases alternative mechanisms may be used. For instance replication validation may be performed over TCP using internal protocols to access specific services on nodes in various clusters.

As described above, capturing failure data in a replication network, especially related to early failures, may be crucial information for efficient fault analysis. Therefore it may be helpful to designate a workflow order to the replication validation activities, including the replication validation checks. The workflow order may be purposefully designed to try to expediently find the most likely sources of early failures. In some cases, the workflow order may be integrated with development and/or deployment of the replication network, including the creation of the replication network, the pairing of clusters within the replication network, and/or deployment of the replication network.

An example workflow order may include replication validation activities that are performed before creation of the replication network, such as verifying any IP addresses, subnet, VLAN, and/or gateway to be used for the replication network, checking for overlap with management and/or other data networks, checking whether the IP pool range is well-formed, etc. Also, the configured MTU value for the replication network may be checked for capability with intra-cluster communication. Further, a check may be performed for duplicate IPs. Duplicate IPs may be checked using "arp-scan," as follows. If the replication subnet is 192.168.0.0/24, for instance, then:

$ sudo arp-scan 192.168.0.0/24|cut-f1|sort|uniq-d

Next in the example workflow order, the replication network may be created. Replication validation activities at this point may include the intra-cluster replication validation checks described relative to FIG. 1. In some cases, the replication validation checks may be performed in the order presented relative to FIG. 1. For instance, node-to-gateway replication validation checks for each node may be performed before node-to-node replication validation checks for each node within the cluster. Before clusters are paired, replication validation activities may then include generally checking whether the replication network is configured correctly for each cluster. After pairing clusters, replication validation activities may include the inter-cluster replication validation checks described relative to FIG. 1, starting with the inter-cluster node-to-gateway replication validation checks. Finally, in some cases, situations after deployment of a replication network may cause bi-directional communication to be disrupted. Therefore, ongoing replication validation activities can help to discover such issues in a timely fashion. For this reason, the replication validation activities may be periodically repeated after deployment of a replication network, and/or repeated at a regular, preset time interval. Other examples of replication validation workflow orders are contemplated.

Replication validation may be able to detect a wide range of connectivity issues that were not apparent during development of a replication network. In some examples, connectivity faults found through replication validation may be related to MTU size or VLAN usage. The default MTU size used for configuring a replication network may be problematic. For instance, where paired clusters are connected via tunneling (e.g., Cisco OTV-layer2), the MTU value may be incompatible with the repackaged packets or ethernet frames. The incompatible MTU size may be difficult to predict during the construction of the replication network, therefore choosing the initial MTU size during initial configuration may be challenging. Replication validation may detect such an incompatible MTU size through fault detection of the replication errors. In another instance, the MTU size may not match between paired clusters, resulting in data replication errors during packet transformation across the replication network. Again, replication validation may detect related errors. In yet another instance, VLAN should be distinct for each cluster. However, various VLAN configuration issues may not be known until detected via replication validation.

In some examples, replication validation may include an overall "pass-fail" criteria for a replication network. A replication validation output may include a pass or fail indication generated from the pass-fail criteria, which may be presented to a user. An example pass-fail criteria follows, where "A" is one cluster (e.g., cluster 102A), "B" is another cluster (e.g., cluster 102B), and C(i, j) refers to a connection between any i-j combination (e.g., "C(A,B)" represents a connection between cluster A and cluster B). Let C(i, j) be 1 where there exists a connection from i to j, otherwise let C(i, j) be 0 (zero). Let "m" and "n" be the number of nodes in clusters A and B, respectively. Let "k" be the sum of m and n.

$$\sum_{a=1}^{m}\sum_{b=1}^{n+1} C(A, B) + \sum_{b=1}^{n}\sum_{a=1}^{m+1} C(B, A) + \sum_{a=1}^{m}\sum_{b=1}^{m} C(A, B) +$$

$$\sum_{a=1}^{n}\sum_{b=1}^{n} C(A, B) + \sum_{a=1}^{m} C(A, \text{gateway}) + \sum_{b=1}^{n} C(B, \text{gateway}) = k(k+2)$$

In this example, an overall result of the replication validation activity for the replication network may be PASS if the above pass-fail criteria is true (e.g., correct). Otherwise, the overall result may be FAIL. Other examples of pass-fail criteria are contemplated.

In some examples, replication validation may include triaging connectivity faults. For instance, replication validation may include performing additional replication validation checks in response to replication validation output. The additional replication validation checks may be performed automatically as part of replication validation activities. In the example shown in FIG. 1, the administrator 114 may initiate the additional replication validation checks, for instance. The administrator 114 may present replication validation output to a user as replication validation output is generated, and before, during, or after performing the additional replication validation checks. Example additional replication validation checks are described below.

Referring again to FIG. 1, in an instance where the inter-cluster node-to-gateway replication validation check (arrow 122) fails, administrator 114 may initiate additional replication validation checks. The inter-cluster node-to-gateway replication validation check may have failed by the "ping" resulting in packet loss, such as 100% packet loss. Stated another way, datastore mapping between paired clusters may have failed. In this case, administrator 114 may check corporate firewalls and routers associated with the clusters 102. The corporate firewalls and router should be configured to allow traffic for the subnets 110 (and/or VLANs) such that the corporate firewall of cluster 102A allows outgoing traffic from subnet 110A and allows incoming traffic from the subnet 110B of cluster 102B. Conversely, the corporate firewall of cluster 102B should allow outgoing traffic from subnet 110B and allow incoming traffic from the subnet 110A of cluster 102A. Also, the corporate router should allow outgoing traffic from subnet 110A to be routed to subnet 110B, and allow outgoing traffic from subnet 110B to be routed to subnet 110A. Failure of any of the above additional replication validation checks may indicate a connectivity fault. The connectivity fault may then be remedied, either automatically by administrator 114 or by presenting replication validation output to a user so that the user may take action.

In an instance where the above additional replication validation checks succeed, (no connectivity fault was discovered), yet datastore mapping between paired clusters 102 still does not work, a different connectivity fault may be the issue. For instance, the connectivity fault may be due to MTU settings. In some corporate environments there may be tunneling of traffic between clusters, which may cause extra headers to appear in IP packets. To accommodate the extra headers, it may be necessary to reduce the MTU size. Administrator 114 may again initiate additional replication validation checks, such as checking that the MTU setting is correct. Administrator 114 may perform this replication validation check from cluster 102A to cluster 102B, and then from cluster 102B to cluster 102A. For example, from a node 104A of cluster 102A to a node 104B of cluster 102B, where the MTU value is 1500 and the replication IP of node 104B is 10.4.247.11, the replication validation check may be as follows:

$ ping -I eth2 -M do -s 1500 10.4.247.11

In an instance where the above replication validation check fails (e.g., there are dropped packets), administrator may retry the replication validation check with a smaller MTU value. Administrator 114 may continue to lower the MTU value and retry the replication validation check until the replication validation check succeeds. In an instance where the current MTU value for the replication network (e.g., 1500) does not work and the replication validation checks find a new MTU value that does work, administrator 114 may update the network configuration by removing and/or unpairing the clusters, reconfiguring the replication network with the new MTU, then pairing the clusters. At this point an inter-cluster node-to-gateway replication validation check may pass. In some examples, replication validation techniques may include an automated mechanism for updating MTU values on all nodes of both clusters, as well as any internal database on both clusters.

In some examples, replication validation output (e.g., results) may be saved. For example, replication validation output may be archived for later use. Replication validation output may be generated relative to particular time points, and the replication validation output for the particular time points may be compared. In this manner, a record of a time during which the replication network was functioning properly may be preserved, and a record may indicate a time window in which a failure occurred. Records of replication validation output may therefore inform failure analysis, such as root cause analysis and/or attempts to isolate problems with the replication network.

As noted above, replication validation output can be presented to a user. Replication validation output may be an easily interpretable presentation of replication validation activities and/or other information related to a replication network. Replication validation output may be presented regardless of a status and/or outcome (e.g., pass/fail) of any particular replication validation activity. Replication validation output may include presentation of connectivity successes and/or faults, including connectivity faults that may have already been automatically resolved. Replication validation output may signal connectivity faults to a user, so that the user may take action to fix the connectivity fault. In some examples, the replication validation output may be presented as JavaScript Object Notation (JSON), such as the example shown in FIGS. 2A-2C. In other examples, the replication validation output may be shown in a graphical user interface (GUI), such as the examples illustrated in FIGS. 3 and 4. The JSON or GUI examples provided in FIGS. 2A-4 are not meant to be limiting, a wide variety of forms of replication validation output is contemplated.

FIGS. 2A-2C collectively illustrate an example replication validation output 200 in the form of JSON text. In FIGS. 2A-2C, the replication validation output is organized as a series of columns 1-6 that represent a continuous JSON text string. Not all aspects of the JSON text will be described for sake of brevity. However, portions 202, 204, and 206 are designated. Portions 202, 204, and 206 may represent replication validation output from replication validation checks. For instance, portions 202 and 204 (in column 1, FIG. 2A) may represent replication validation checks that succeeded, indicated by "SUCCEEDED" in the JSON text (e.g., a pass-fail indication). Portion 206 (in column 2, FIG. 2A) may represent a replication validation check that failed, indicated by "FAILED" in the JSON text. In some cases, replication validation output 200 may be surfaced to a user. The user may then be able to interpret the replication validation output 200, and therefore be able to take action to remedy any connectivity faults found.

Figure 3:
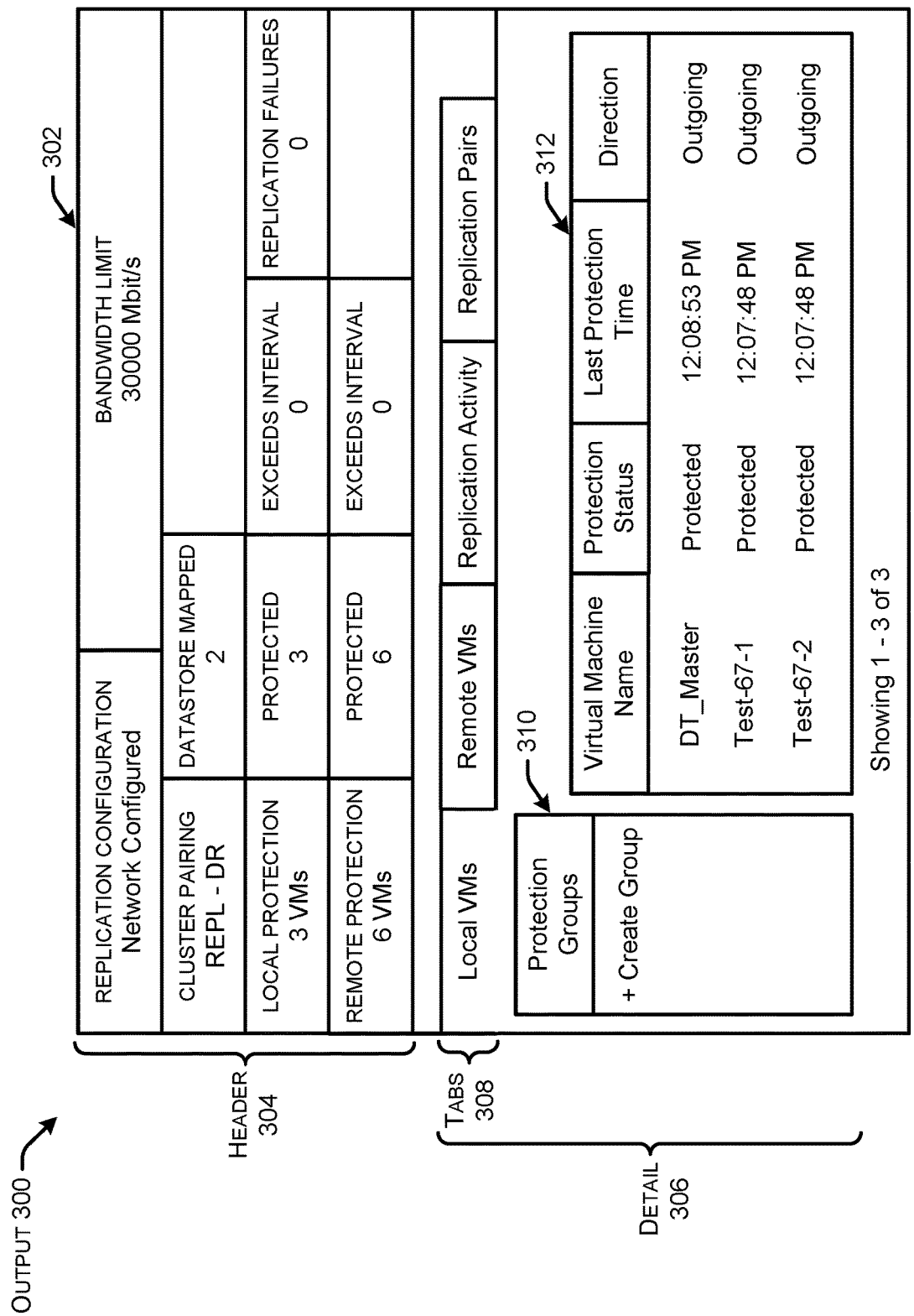
FIGS. 3 and 4 illustrate example replication validation outputs as graphical user interfaces (GUI), in accordance with the present concepts.
Figure 4:
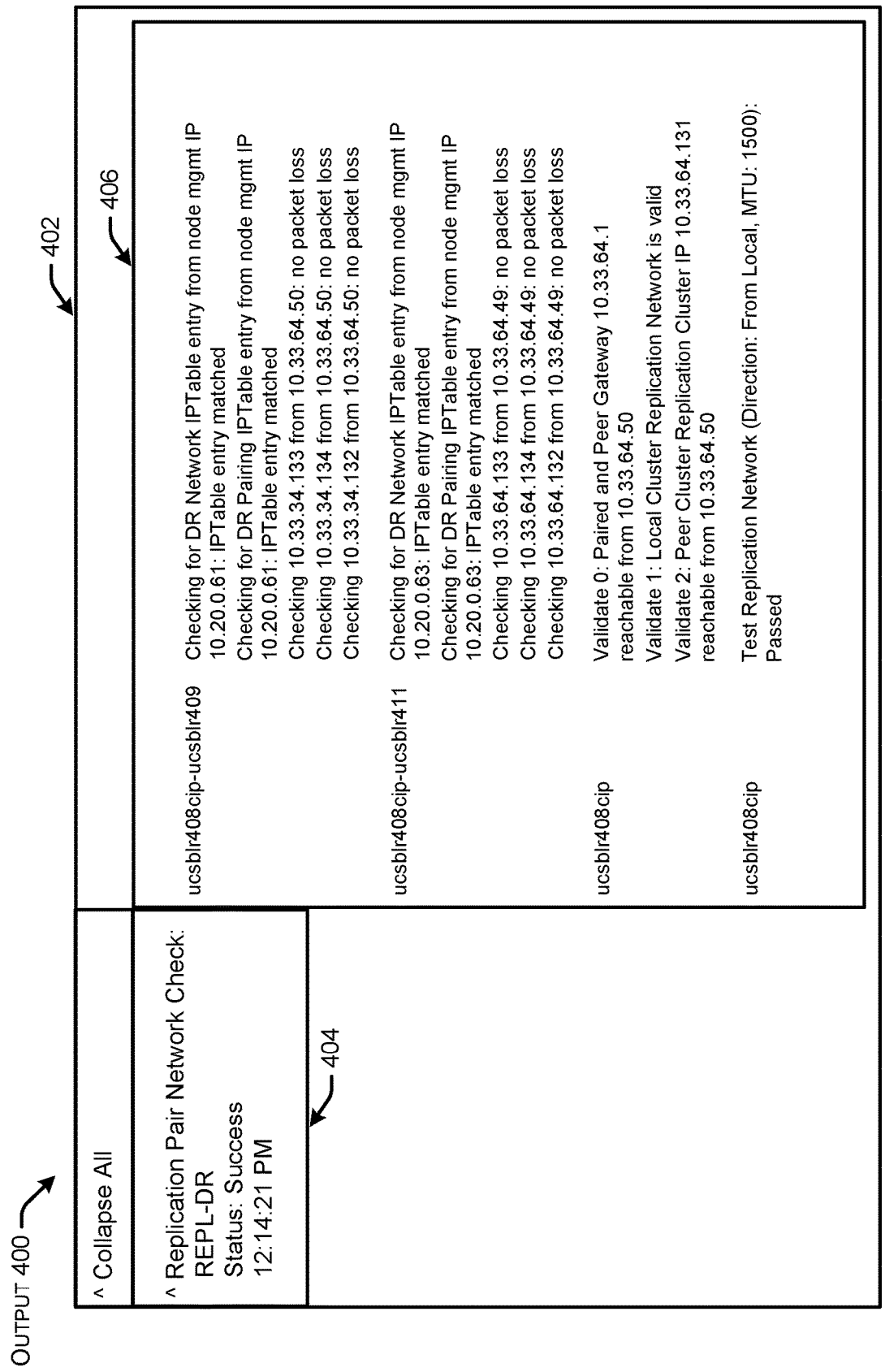

FIGS. 3 and 4 illustrate example replication validation outputs 300 and 400, respectively. In FIG. 3, replication validation output 300 is shown in the form of an example graphical user interface (GUI) 302. GUI 302 can include a header 304 and a section with detail 306 regarding a replication network and/or replication validation activity. The detail 306 section can include selectable tabs 308. In GUI 302, the currently selected tab 308 is "Local VMs," which includes a control window 310 and a data table 312. The data table 312 may present information regarding a replication network (e.g., network 100), such as a current status of components of the replication network. Note that in some examples, replication validation may be initiated by a user interacting with a GUI.

In FIG. 4, replication validation output 400 is shown in the form of an example graphical user interface (GUI) 402. GUI 302 can include an index portion 404 and a data display area 406. In some examples, the data display area 406 can include replication validation output for replication validation checks. The data display area 406 can also include pass-fail indications for particular replication validation checks, for example.

Various examples of replication validation activities have been described above. Additional examples of replication validation activities are provided below. The examples below include additional types of replication validation checks. Also, the examples below may be viewed as an additional example workflow for replication validation activities.

In some implementations, intra-cluster replication validation activities may include aspects of the following example intra-cluster workflow. For instance, intra-cluster replication validation activities may include detecting if a gateway check needs to be done, detecting if an MTU value check needs to be done, detecting if a bandwidth check needs to be done, and/or detecting if a cluster configuration check needs to be done. Information related to nodes in the cluster may be gathered from a local inventory (e.g., storage). In some examples, information is gathered for converged nodes (e.g., nodes that perform storage and computation) in the cluster, since compute-only nodes may not participate in a replication network.

The example intra-cluster workflow may proceed with prevalidation activities, including confirming a replication network of the cluster. For instance, if a gateway is configured for the cluster, the gateway may be checked for connectivity. Otherwise, if no gateway is included, checks involving the gateway may be bypassed.

The example intra-cluster workflow may proceed with replication validation activities, including determining that the replication network is valid. The replication validation activities can include intra-cluster replication validation checks as described above, including performing a check from each node of the cluster to the gateway of the cluster (if a gateway is included), to the floating IP of the cluster, and to all of the other nodes (e.g., converged nodes) in the cluster. The checks can include checking for connectivity, MTU, bandwidth, cluster configuration, firewall rule configuration, for example. In some examples, not all of these checks may be requested for every node-to-node, node-to-gateway, and/or node-to-floating IP pair. The replication validation activities described here may be abstracted into a re-usable library in some cases. Various additional examples of connectivity (e.g., reachability) checks are provided below. The examples shown below are presented with ICMP network protocol. As noted above, other TCP-based checks are contemplated.

fping reference: https://fping.org/
fping command to check liveness: "fping -I eth2"
fping command to check MTU of 1440: "fping -I eth2 -M -c 1 -q -b 1440"

Various examples of fping output are provided below. For a success case resulting from an fping, the output may appear as (e.g., a buffer may be populated as):

10.10.1.1 is alive
10.10.1.2 is alive
10.10.1.3 is unreachable
10.10.1.4 is alive For an error case resulting from an fping, the output may appear as below. An error case may occur in an instance where the network is down at the source node for the ping, for example.

10.10.1.1: error while sending ping: No route to host
10.10.1.2: error while sending ping: No route to host
10.10.1.3: error while sending ping: No route to host
10.10.1.4: error while sending ping: No route to host Example outputs from MTU value checks may appear as:
10.88.1.235: xmt/rcv/% loss=1/0/100%
10.88.1.236: xmt/rcv/% loss=1/0/100%
10.89.1.141: xmt/rcv/% loss=1/1/0%, min/avg/max=0.85/0.85/0.85
10.89.1.141: xmt/rcv/% loss=1/1/0%

In the first example MTU value check above, 10.88.1.235 is the target node/IP address, one packet was transmitted, no packet was received, there was 100% loss, for example.

In some examples, results can be constructed and/or compiled for the checks described above. Compiled results may include various information, such as IP addresses, timestamps, reachability, rule checks, and/or other details. In some instances, fping output may be converted to error codes. Example conversions of replication validation outputs to error codes may include:

alive=>0
unreachable=>1
fping_error=>2
packet_loss=>3
mtu_valid=>4
default=>2 (error)

The example intra-cluster workflow can include converting the replication validation outputs to a user-friendly format. In some examples, the replication validation outputs for any check may include a source IP (e.g., the address of the node from which the "ping" originates), a target IP (e.g., the address of the node to which the "ping" is directed), a type of the check (e.g., connectivity, MTU value), whether the check passed or failed, etc. The replication validation outputs may be summarized, and/or an overall status of the replication validation activities may be determined.

In some implementations, inter-cluster replication validation activities may include aspects of the following example inter-cluster workflow. The inter-cluster workflow may include similar elements to the example intra-cluster workflow described above. For instance, intra-cluster replication validation activities may include detecting if a gateway check needs to be done, detecting if an MTU value check needs to be done, detecting if a bandwidth check needs to be done, and/or detecting if a cluster configuration check needs to be done. Information related to nodes in the cluster may be gathered from an inventory. Prevalidation activities may include confirming a replication network of the cluster and/or checking a gateway for connectivity. In some cases, if a gateway check is not successful, check to nodes of the paired cluster may be skipped where the paired cluster is unreachable.

In the example inter-cluster workflow, replication validation activities may include checking that a cluster pairing has completed successfully. Also, a check may be performed to confirm that a modification to the cluster pairing is not in flight (e.g., currently being performed). For instance, a cluster pairing may be in the process of being unpaired and/or unlinked in another manner.

In the example inter-cluster workflow, a paired cluster may be described as including a "local" cluster and a "peer" cluster. Replication validation activities may include performing checks relative to the local cluster or the peer cluster, and/or initiating replication validation activities from the local cluster or the peer cluster. For instance, inter-cluster replication validation activities may validate directionally from the local cluster to peer cluster, or vice versa. Alternatively or additionally, inter-cluster replication validation activities may use the credentials of the peer cluster to request the peer to perform inter-cluster replication validation activities from the peer cluster to the local cluster. In this instance, the results may be gathered at the local cluster for presentation to a user. Stated another way, initiation and/or directionality of replication validation activities is contemplated as originating from a variety of locations, such as from individual clusters (e.g., cluster 102A or cluster 102B) and/or from an administrator (e.g., administrator 114).

In some examples, checks relative to the local cluster may include gathering various additional information, such as a management IP and/or replication network IP for the peer cluster, and/or local and peer subnet information. The local cluster may check whether the peer replication network IP is reachable from a local node, potentially with a specified MTU value. If the peer replication network IP is reachable, the local cluster may check the nodes of the peer cluster from the nodes of the local cluster, which may include getting IPs for the nodes of the peer cluster, and/or reporting an error if an IP is not available.

In some examples, checks relative to the peer cluster may be similar to checks originating from the local cluster. Additionally, checks relative to the peer cluster may include establishing whether the peer is capable of performing replication validation activities, such as where the local cluster is unable to reach the peer. In some examples, the intra-cluster and/or inter-cluster checks may be performed in parallel. For instance, the checks may be complete before replication validation outputs are gathered and compiled.

The example inter-cluster workflow may include constructing and/or accumulating replication validation outputs, which may be similar to those described above for the example intra-cluster workflow. The information gathered relating to the local and/or peer cluster may be used to determine whether the subnets of the clusters and/or the replication network as a whole is valid, whether an MTU size is appropriate, whether firewall configurations are valid, whether expected services at any particular node are valid, etc. The results may be collated and/or summarized relative to local and/or peer clusters. Additional example status and/or error strings may include:

"Local Cluster Replication Network is valid"
"Local Cluster DR network has no gateway"
"Local Cluster DR network has no Replication CIP"
"Local cluster DR network has no Node Replication IP"
"Checking for DRNetwork IPTable entry from node mgmt. IP < . . . > iptables entry matched"
"Checking for "DR Pairing IPTable entry forom node mgmt . . . IP < . . . > iptables entry matched"
"Checking <IP1> from <IP2>: no packet loss"

Figure 5:
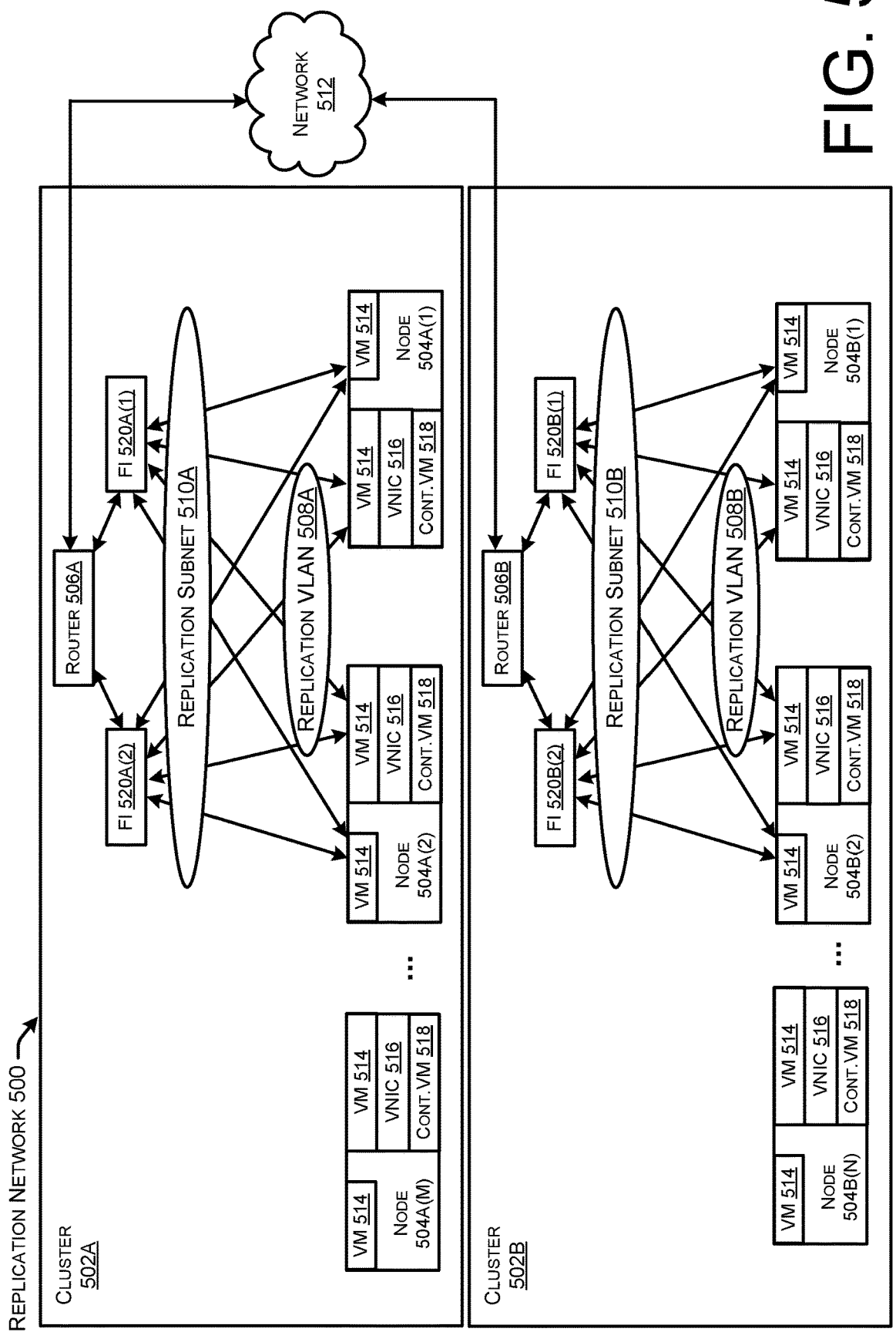

FIG. 5 depicts an example replication network 500, which includes clusters 502. Clusters 502 include nodes 504 (e.g., servers, hosts), routers 506, replication VLANs 508, and replication subnets 510. To support efficient replication, all M nodes of cluster 502A may need to communicate with all N nodes 504B of cluster B, and vice versa. This may be referred to as M×N connectivity between clusters. Such connectivity may require that each node 504A on cluster 502A be able to communicate with each node 504B on cluster 502B, and vice versa. Therefore, routers 506 (and/or firewalls) may be configured to transmit and receive data for the respective clusters 502 via network 512. Additionally, replication networks may isolate both intra-cluster and inter-cluster replication traffic from other traffic. In general, the development of a replication network can include creating a replication network on each cluster, then pairing the replication networks and establishing M×N connectivity between the paired clusters.

In some examples, nodes 504 may host a number of virtual machines (VMs) 514, The VMs 514 may include one or more virtual network interface controllers (VNICs) 516. Also, nodes 504 may include a respective controller VM 518 for replication. The VM 514, VNIC 516, and controller VM 518 components are shown in FIG. 5, but not designated with specificity to avoid clutter on the drawing page. In some examples, the VNICs 516 and controller VMs 518 may be viewed as together forming the replication VLAN 508 for the replication network, dedicated to pairing and replication operations. For instance, each controller VM 118 may be assigned a network interface, such as an Ethernet interface, for transmitting and receiving replication traffic. Also, within clusters 502, subnets 510 may be configured to allow any node 504 or VM 514 to communicate with others nodes 504 or VMs 514 within the clusters 502.

Clusters 502 may further include fabric interconnectors (FIs) 520 that interconnect nodes 504 within clusters 502. For example, as shown in FIG. 5, cluster 502A may include two FIs 520, FI 520A(1) and FI 520A(2). FI 520A(1) and FI 520A(2) may be viewed as forming replication subnet 510A. In other embodiments, subnets 510 may be built on a different architecture of interconnection in addition, or alternative, to an FI.

A general process for replication network development may proceed as follows. During a cluster installation or cluster upgrade stage, network resources may be pre-provisioned on each node 504 (e.g., physical, converged host). For example, a new port-group may be created on a node 504 for the purpose of replication. The port-group may be associated with a physical interface used for a management network. Network resources may also be pre-provisioned on controller VMs 518 associated with nodes 504. For example, a new distinct virtual ethernet interface may be pre-provisioned on each controller VM 518. The ethernet interface on the controller VMs 518 may be associated with the new port group on nodes 504.

To prepare for cluster pairing, network resources may be provisioned by the network administrator of each site. For example, subnets 510 in clusters 502 may be considered as IP subnets. Each of the IP subnets may contain at least M+1 IPs (or N+1 IPs), where M is the number of converged nodes 504 in the cluster 502. The IP subnets may be dedicated for replication between the clusters 502. In order to accommodate future expansion of clusters 502, a range of IP addresses (e.g., an IP subnet), may be used to configure the clusters 502 for disaster recovery. Each of the IP subnets is given a VLAN identifier (ID). Entity firewalls and route tables may be modified to allow incoming traffic to the VLAN 508 and subnet 510, and to allow traffic from the IP subnet/VLAN to be routed to an external network. Bandwidth can also be provisioned for inter-cluster communications.

To further prepare for cluster pairing, clusters 502 may be configured with an intra-cluster replication network (e.g., subnets 510). For example, controller VMs 518 in clusters 502 may be configured such that pre-provisioned ethernet interfaces may be assigned replication-specific IP addresses. Route tables may be modified to enable connectivity between nodes 504 within clusters 502, over the new interfaces. Firewall rules may be modified to allow incoming traffic from other nodes 504 within clusters 502 over the replication subnets 510.

On nodes 504, a VLAN ID may be associated with the replication port group. In some embodiments, bandwidth limits can also be associated with the port group. In one embodiment, VLANs 508 can be configured on the fabric interconnection of clusters 502. In one embodiment, a cluster-wide replication cluster IP is designated and assigned to one of the converged nodes 504 in a cluster 502. A service may also be initiated to ensure a replication cluster IP is highly available in a cluster 502.

After clusters have been prepared for pairing as explained above, a cluster pairing workflow to pair clusters 502 can be invoked. In one embodiment, this cluster pairing workflow employs credentials of the peer cluster, with administrative privileges. For security reasons, these credentials may not be persisted on the clusters 502. First, an inter-cluster pairing protocol can be performed. Cluster 502B can be modified using replication network details from cluster 502A (information for replication related to cluster 502A). For example, firewall rules on each controller VM 518 on cluster 502B may be modified to allow the incoming traffic from subnet 510A of cluster 502A and to allow the outgoing traffic to subnet 510A of cluster 502A to use the replication interface. Similarly, cluster 502A can be modified with replication network details of cluster 502B (information for replication related to cluster 502B). The replication network details may include a cluster name of the peer cluster, an identifier of the peer cluster, an identifier of a gateway of the peer subnet, and/or a replication cluster IP address for the peer cluster, for example. The cluster pairing workflow may be configured to be idempotent and can be invoked again to complete the cluster pairing workflow, in case of any failure during the cluster pairing workflow. That is, the details of pairing operations are logged in a cluster pairing workflow inventory for each cluster 502. Upon success, M×N connectivity may be established between the clusters 502, for bidirectional replication, when cluster 502A has M nodes 504A and cluster 502B has N nodes 504B. Once the cluster pairing succeeds, all future communications for disaster recovery between the clusters 502 can use the new communication channel that is generated for replication between the cluster 502A and the cluster 502B.

In some examples, the replication network set up may include provisioning a floating IP address (see floating IP 106 in FIG. 1). In some cases, a converged node 504 (e.g., a node that provides storage) may be assigned the floating IP address. In some embodiments, while there may be brief periods of time when there is no node 504 with the floating IP, at most times the floating IP may be assigned to exactly one controller VM 518 of a node 504. The floating IP may be configured to be highly available. In one embodiment, the highly-available floating IP may be implemented using a leader election scheme in distributed systems.

The floating IP may be used for various purposes without the fear of the unreachability of the associated IP address because of a node failure. For example, the floating IP may be used to discover the cluster resources (e.g., a number of nodes in a cluster, properties of the nodes, etc.), set up protection for VMs, remove protection for VMs, add/edit/remove groups of VMs, manage various replication operations of a VM, manage various file system operations for a file that needs to be replicated including creation, deletion and cloning, and monitor the health of the peer cluster.

Figure 6:
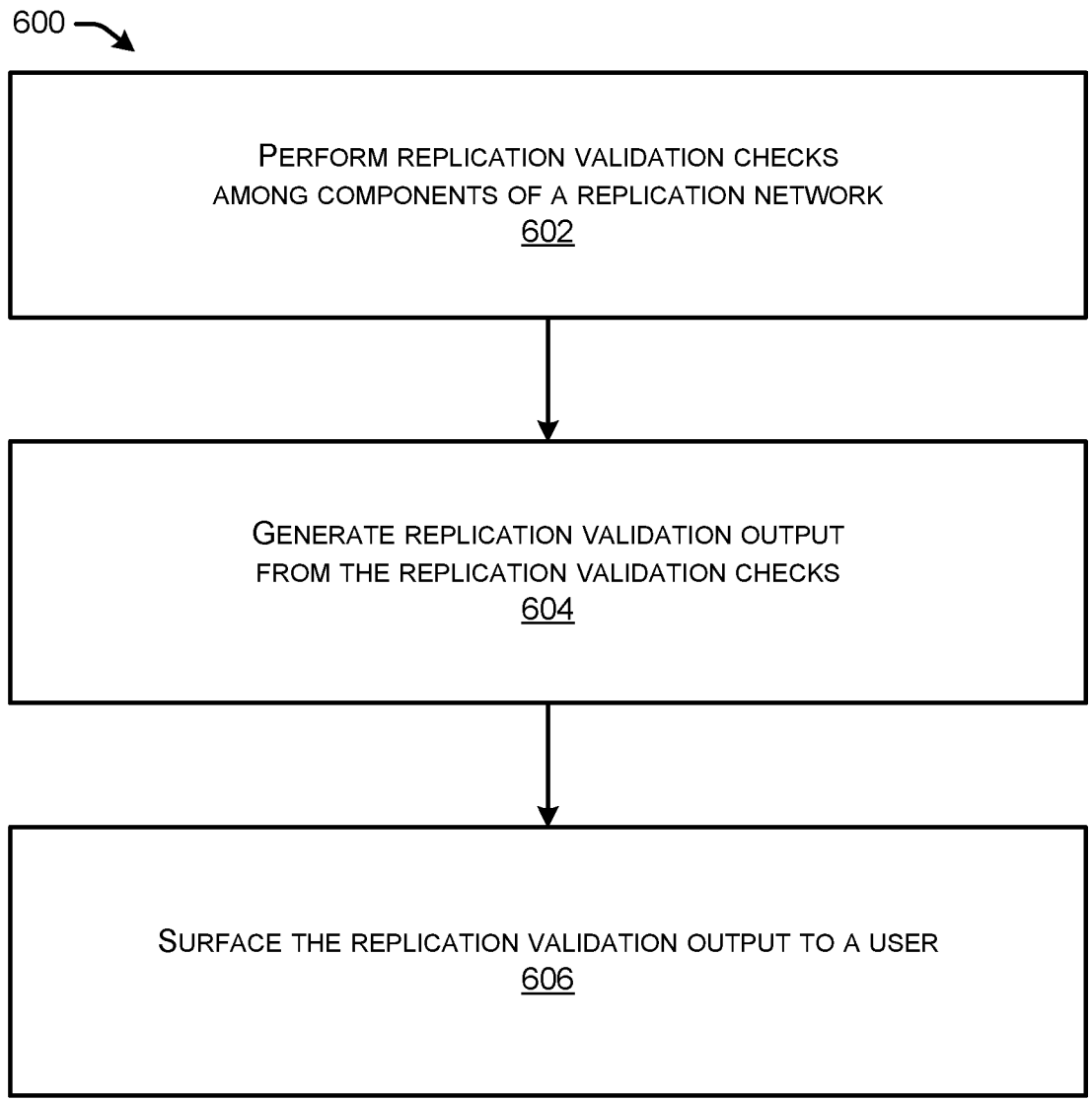
FIGS. 6 and 7 illustrate flow diagrams of example methods for validating replication networks.
Figure 7:
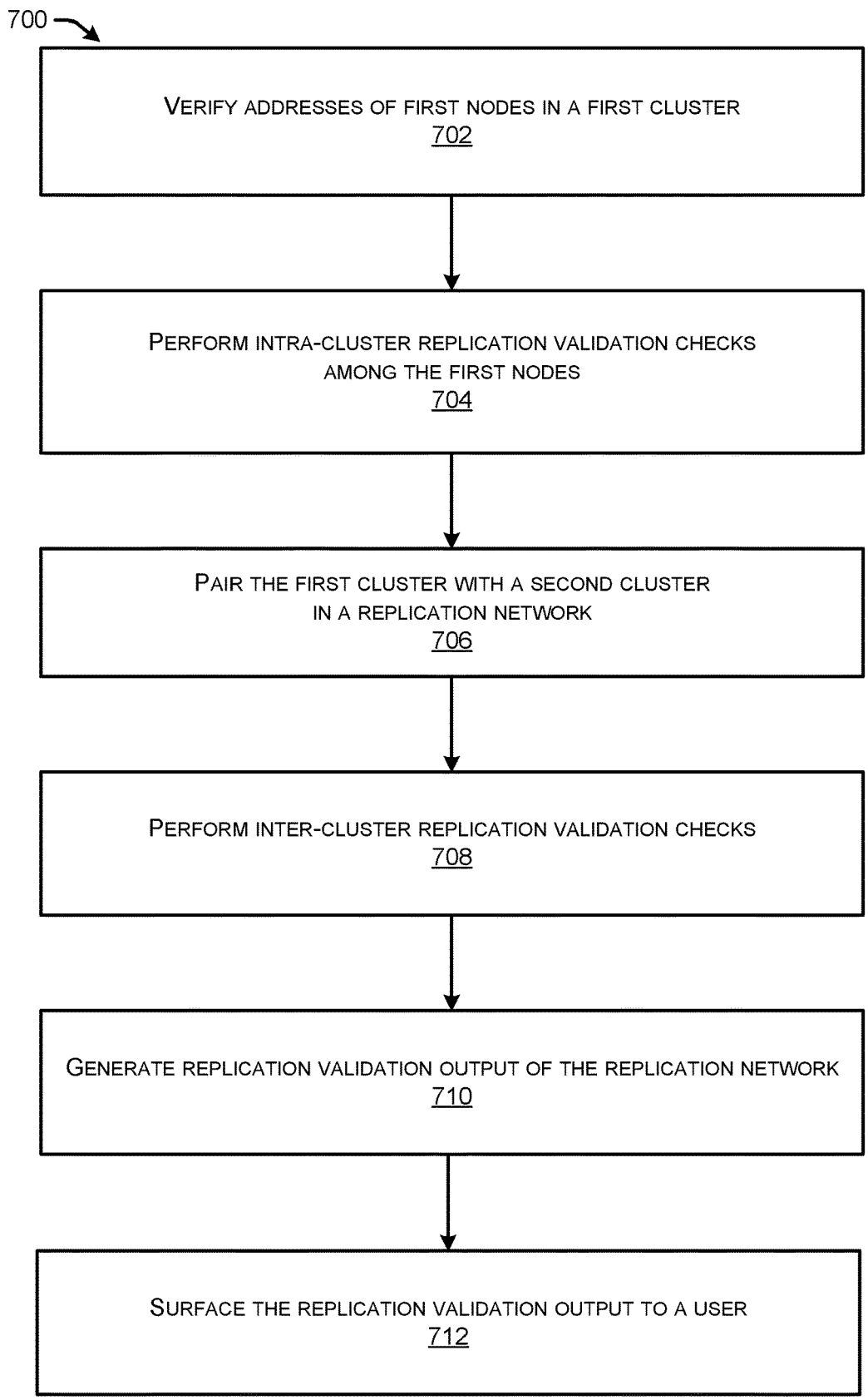

FIGS. 6 and 7 illustrate flow diagrams of example methods 600 and 700 that illustrate aspects of the functions performed at least partly by the devices described relative to FIGS. 1 and 5. The logical operations described herein with respect to FIGS. 6 and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6 and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of an example method 600 for replication validation in a replication network (e.g., replication network 100 in FIG. 1). In some examples, the method 600 may be performed, at least in part, by a device (e.g., administrator 114 in FIG. 1) that comprises one or more processors and one or more non-transitory computer-readable media storing computer-executable instructions that, when executed by the one or more processors, cause the one or more processors to perform the steps of method 600.

At 602, an administrator may perform replication validation checks among components of a replication network. For example, the replication validation checks may be among first nodes of a first cluster, from the first nodes of the first cluster to a first gateway of the first cluster, among second nodes of a second cluster, from the second nodes of the second cluster to a second gateway of the second cluster, from the first nodes to the second gateway, from the first nodes to the second nodes, from the second nodes to the first gateway, and/or from the second nodes to the first nodes.

At 604, the administrator may generate replication validation output from the replication validation checks. For instance, the replication validation output may be derived from a pass-fail criteria, and/or may include pass-fail indications for the replication validation checks.

At 606, the administrator may send user interface data to a client device for presentation to a user. The user interface data may be based at least in part on the replication validation output, for instance.

In some examples, the replication validation output may include pass-fail indications for the replication validation checks. Method 600 may include repeating the validation checks after a data transfer between the first cluster and the second cluster via the replication network to ensure ongoing connectivity. Additionally or alternatively, method 600 may include repeating the replication validation checks after a reconfiguration of the replication network.

Further, in some examples, method 600 may include checking a corporate firewall configuration related to the first cluster or the second cluster. For instance, the corporate firewall may be checked in response to a failure of a particular replication validation check. Also in response to a failure of a particular replication validation check, method 600 may include selecting a lower maximum transmission unit (MTU) value for the replication network and repeating the particular replication validation check. In an instance where the repeated particular replication validation check passes with the lower MTU value, method 600 may include automatically reconfiguring the replication network with the lower MTU value.

FIG. 7 illustrates a flow diagram of an example method 700 for replication validation in a replication network (e.g., replication network 100 in FIG. 1). In some examples, the method 700 may be performed, at least in part, by a device (e.g., administrator 114 in FIG. 1) that comprises one or more processors and one or more non-transitory computer-readable media storing computer-executable instructions that, when executed by the one or more processors, cause the one or more processors to perform the steps of method 700.

At 702, an administrator may verify addresses of first nodes in a first cluster. In some cases, method 700 may include verifying IP addresses, subnet, VLAN, and/or gateway to be used for the replication network, checking for overlap with management and/or other data networks, checking whether the IP pool range is well-formed, etc.

Also, the configured MTU value for the replication network may be checked for capability with intra-cluster communication. Further, a check may be performed for duplicate IPs. Duplicate IPs may be checked using "arp-scan," for instance.

At 704, the administrator may perform intra-cluster replication validation checks among the first nodes. For instance, the replication validation check may be a "ping" from one node to another.

At 706, the administrator may pair the first cluster with a second cluster in a replication network. In some examples, the second nodes of the second cluster may be mapped to the first nodes of the first cluster.

At 708, the administrator may perform inter-cluster replication validation checks. For example, the inter-cluster replication validation checks may check connectivity from the first nodes to the second nodes and from the second nodes to the first nodes.

At 710, the administrator may generate replication validation output of the replication network. The replication validation output may be in response to the intra-cluster replication validation checks and/or the inter-cluster replication validation checks.

At 712, the administrator may send user interface data to a client device for presentation to a user. The user interface data may be based at least in part on the replication validation output, for instance.

In some examples, method 700 may include performing the intra-cluster replication validation checks before performing the inter-cluster replication validation checks. In some implementations, the replication validation output may include pass-fail indications. The pass-fail indications may be an indication that a replication validation check succeeded or failed. For instance, the pass-fail indications may include successful inter-cluster or intra-cluster replication validation checks, failed inter-cluster or intra-cluster replication validation checks, etc. In some cases, the replication validation output may include other information, such as an indication of an MTU value associated with an inter-cluster replication validation check that succeeded or failed.

Figure 8:
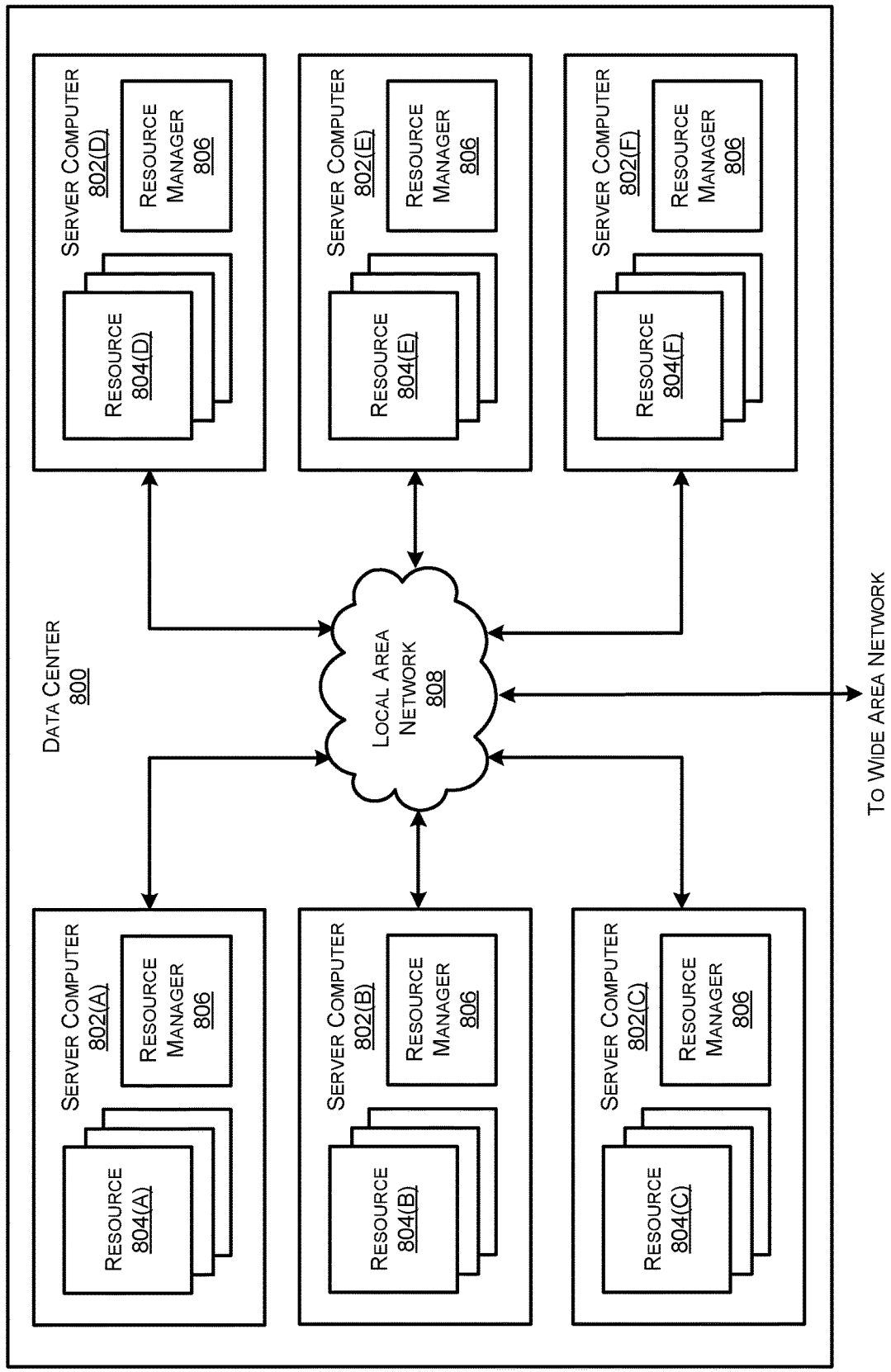
FIG. 8 illustrates a computing system diagram illustrating a configuration for a data center that can be utilized to implement aspects of the technologies disclosed herein.

FIG. 8 is a computing system diagram illustrating a configuration for a data center 800 that can be utilized to implement aspects of the technologies disclosed herein. The example data center 800 shown in FIG. 8 includes several computers 802A-802F (which might be referred to herein singularly as "a computer 802" or in the plural as "the computers 802") for providing computing resources. In some examples, the resources and/or computers 802 may include, or correspond to, any type of networked device described herein, such as administrator 114, nodes 104, floating IP 106, and/or gateway 108 (FIG. 1). Although computers 802 may comprise any type of networked device, such as servers, switches, routers, hubs, bridges, gateways, modems, repeaters, access points, hosts, etc.

The computers 802 can be standard tower, rack-mount, or blade server computers configured appropriately for providing computing resources. In some examples, the computers 802 may provide computing resources 804 including data processing resources such as virtual machine (VM) instances or hardware computing systems, database clusters, computing clusters, storage clusters, data storage resources, database resources, networking resources, and others. Some of the computers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single computer 802. Computers 802 in the data center 800 can also be configured to provide network services and other types of services.

In the example data center 800 shown in FIG. 8, an appropriate local area network (LAN) 808 is also utilized to interconnect the computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the computers 802A-802F in each data center 800, and, potentially, between computing resources in each of the computers 802. It should be appreciated that the configuration of the data center 800 described with reference to FIG. 8 is merely illustrative and that other implementations can be utilized.

In some examples, the computers 802 may each execute one or more application containers and/or virtual machines to perform techniques described herein. For instance, the containers and/or virtual machines may serve as administrator 114 and/or nodes 104 in replication network 100 (FIG. 1).

In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a data center 800 that can be utilized to implement the technologies disclosed herein will be described below with regard to FIG. 9.

Figure 9:
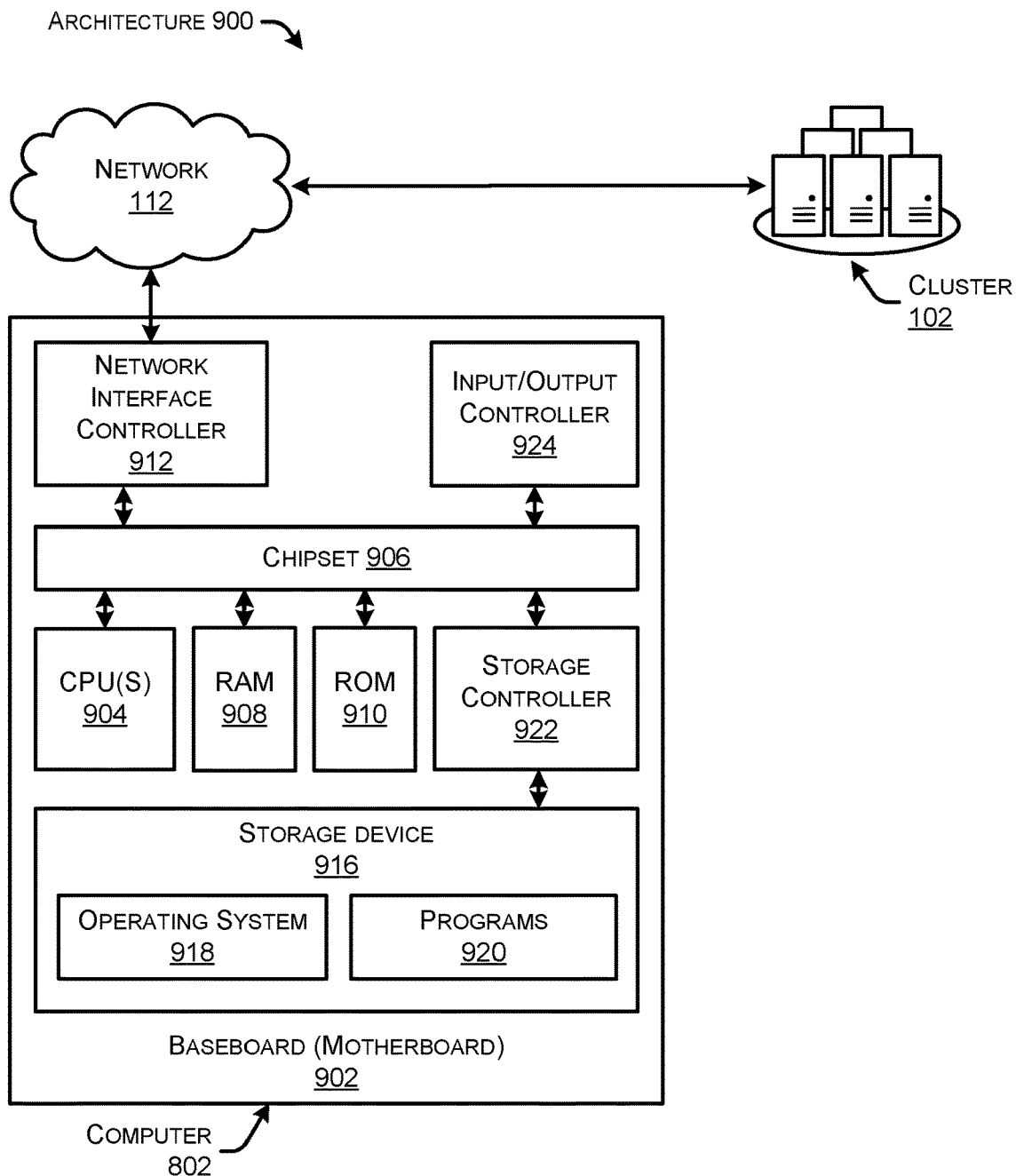
FIG. 9 is a computer architecture diagram showing an illustrative computer hardware architecture for implementing a computing device that can be utilized to implement aspects of the various technologies presented herein.

FIG. 9 shows an example computer architecture 900 for a computer 802 capable of executing program components for implementing the functionality described above. The computer architecture shown in FIG. 9 illustrates a conventional server computer, workstation, desktop computer, laptop, tablet, network appliance, e-reader, smartphone, and/or other computing device, and can be utilized to execute any of the software components presented herein. The computer 802 may, in some examples, correspond to a physical device described herein (e.g., administrator, node, host, server, etc.), and may comprise networked devices such as servers, switches, routers, hubs, bridges, gateways, modems, repeaters, access points, etc. For instance, computer 802 may correspond to administrator 114.

As shown in FIG. 9, the computer 802 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 802.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 802. The chipset 906 can further provide an interface to a computer-readable storage medium such as a read-only memory ("ROM") 910 or non-volatile RAM ("NVRAM") for storing basic routines that help to startup the computer 802 and to transfer information between the various components and devices. The ROM 910 or NVRAM can also store other software components necessary for the operation of the computer 802 in accordance with the configurations described herein.

The computer 802 can operate in a networked environment using logical connections to remote computing devices and computer systems through a network, such as networks 808 or 112. The chipset 906 can include functionality for providing network connectivity through a network interface controller (NIC) 912, such as a gigabit Ethernet adapter. The NIC 912 is capable of connecting the computer 802 to other computing devices over the network 112. For instance, in the example shown in FIG. 9, NIC 912 may help facilitate replication validation activities over network 112 with cluster(s) 102. It should be appreciated that multiple NICs 912 can be present in the computer 802, connecting the computer to other types of networks and remote computer systems.

The computer 802 can be connected to a storage device 916 that provides non-volatile storage for the computer. The storage device 916 can store an operating system 918, programs 920, and/or data, which have been described in greater detail herein. For instance, the programs 920 may relate to replication validation activities. The storage device 916 can be connected to the computer 802 through a storage controller 922 connected to the chipset 906, for example. The storage device 916 can consist of one or more physical storage units. The storage controller 922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 802 can store data on the storage device 916 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 916 is characterized as primary or secondary storage, and the like.

For example, the computer 802 can store information to the storage device 916 by issuing instructions through the storage controller 922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 802 can further read information from the storage device 916 by detecting the physical states or characteristics of one or more particular locations within the physical storage units.

In addition to the mass storage device 916 described above, the computer 802 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 802. In some examples, the operations performed by the replication network 100, and or any components included therein, may be supported by one or more devices similar to computer 802. Stated otherwise, some or all of the operations performed by the network 100, and or any components included therein, may be performed by one or more computer devices 802 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 916 can store an operating system 918 utilized to control the operation of the computer 802. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 916 can store other system or application programs and data utilized by the computer 802.

In one embodiment, the storage device 916 or other computer-readable storage media is encoded with computer-executable instructions which, when loaded into the computer 802, transform the computer from a general-purpose computing system into a special-purpose computer capable of implementing the embodiments described herein. These computer-executable instructions transform the computer 802 by specifying how the CPUs 904 transition between states, as described above. According to one embodiment, the computer 802 has access to computer-readable storage media storing computer-executable instructions which, when executed by the computer 802, perform the various processes described above with regard to FIGS. 1-7. The computer 802 can also include computer-readable storage media having instructions stored thereupon for performing any of the other computer-implemented operations described herein.

The computer 802 can also include one or more input/output controllers 924 for receiving and processing input from a number of input devices, such as a keyboard, a mouse, a touchpad, a touch screen, an electronic stylus, or other type of input device. Similarly, an input/output controller 924 can provide output to a display, such as a computer monitor, a flat-panel display, a digital projector, a printer, or other type of output device. In some examples, the computer 802 may send user interface data to a display device (and/or to a client device that includes a display) for presentation to a user. For instance, the user interface data may be based on replication validation output. In some examples, the display can surface replication validation output and/or user interface data to a user, such as via a graphical user interface (GUI). It will be appreciated that the computer 802 might not include all of the components shown in FIG. 9, can include other components that are not explicitly shown in FIG. 9, or might utilize an architecture completely different than that shown in FIG. 9.

As described herein, the computer 802 may comprise one or more devices, such as administrator 114, nodes 104, floating IP 106, and/or gateway 108. The computer 802 may include one or more hardware processors 904 (processors) configured to execute one or more stored instructions. The processor(s) 904 may comprise one or more cores. Further, the computer 802 may include one or more network interfaces configured to provide communications between the computer 802 and other devices, such as the communications described herein as being performed by administrator 114, nodes 104, floating IP 106, and/or gateway 108. In some examples, the communications may include the example replication validation activities described herein, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 920 may comprise any type of programs or processes to perform the techniques described in this disclosure in accordance with conversation-based policy distribution techniques. For instance, the programs 920 may cause the computer 802 to perform techniques for communicating with other devices using any type of protocol or standard usable for determining connectivity. Additionally, the programs 920 may comprise instructions that cause the computer 802 to perform the specific techniques for replication validation described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   performing replication validation checks among components of a replication network, including:
   among first nodes of a first cluster of the replication network,
   from the first nodes of the first cluster to a first gateway of the first cluster,
   among second nodes of a second cluster of the replication network,
   from the second nodes of the second cluster to a second gateway of the second cluster,
   from the first nodes to the second gateway,
   from the first nodes to the second nodes,
   from the second nodes to the first gateway, and
   from the second nodes to the first nodes; and
   generating replication validation output from the replication validation checks among the components of the replication network; and
   sending user interface data to a client device for presentation to a user, the user interface data based at least in part on the replication validation output.

2. The method of claim 1, wherein the replication validation output includes pass-fail indications for the replication validation checks.

3. The method of claim 1, wherein:
   the replication validation checks within the first cluster are intra-cluster replication validation checks;
   the replication validation checks from the first cluster to the second cluster are inter-cluster replication validation checks; and
   the intra-cluster replication validation checks are performed before the inter-cluster replication validation checks.

4. The method of claim 1, further comprising:
   repeating the replication validation checks after a data transfer between the first cluster and the second cluster via the replication network.

5. The method of claim 1, further comprising:
   determining that at least a portion of the replication network has been reconfigured; and
   repeating the replication validation checks at least partly in response to the determining that at least a portion of the replication network has been reconfigured.

6. The method of claim 1, further comprising:
determining that a particular replication validation check has failed; and
in response to the failed particular replication validation check, checking a corporate firewall configuration related to the first cluster or the second cluster.

7. The method of claim 1, further comprising:
determining that a particular replication validation check has failed; and
at least partly in response to the determining that the particular replication validation check has failed, selecting a lower maximum transmission unit (MTU) value for the replication network and repeating the particular replication validation check.

8. The method of claim 7, further comprising:
determining that the repeated particular replication validation check has passed with the lower MTU value; and
at least partly in response to the determining that the repeated particular validation check has passed, automatically reconfiguring the replication network with the lower MTU value.

9. A computing device comprising:
one or more processors; and
one of more non-transitory computer-readable media storing computer-executable instructions that, when executed by the one or more processors, cause the one or more processors to:
perform replication validation checks among components of a replication network, including:
among first nodes of a first cluster of the replication network,
among second nodes of a second cluster of the replication network,
from the second nodes to a first gateway of the first cluster, and
from the first nodes to a second gateway of the second cluster;
in response to the replication validation checks among the components of the replication network, generate replication validation output for the components of the network; and
send user interface data to a client device for presentation to a user, the user interface data based at least in part on the replication validation output.

10. The computing device of claim 9, wherein the replication validation output includes pass-fail indications for the replication validation checks.

11. The computing device of claim 9, wherein:
the replication validation checks within the first cluster are intra-cluster replication validation checks;
the replication validation checks from the first cluster to the second cluster are inter-cluster replication validation checks; and
the intra-cluster replication validation checks are performed before the inter-cluster replication validation checks.

12. The computing device of claim 9, wherein the computer-executable instructions further cause the one or more processors to:
repeat the replication validation checks after a data transfer between the first cluster and the second cluster via the replication network.

13. The computing device of claim 9, wherein the computer-executable instructions further cause the one or more processors to:
repeat the replication validation checks after a reconfiguration of the replication network.

14. The computing device of claim 9, wherein the computer-executable instructions further cause the one or more processors to:
in response to a failure of a particular replication validation check, check a corporate firewall configuration related to the first cluster or the second cluster.

15. The computing device of claim 9, wherein the computer-executable instructions further cause the one or more processors to:
in response to a failure of a particular replication validation check, select a lower maximum transmission unit (MTU) value for the replication network and repeat the particular replication validation check.

16. The computing devices of claim 15, further comprising:
in an instance where the repeated particular replication validation check passes with the lower MTU value, automatically reconfigure the replication network with the lower MTU value.

17. A method comprising:
verifying addresses of first nodes in a first cluster in a replication network;
performing intra-cluster replication validation checks among the first nodes;
pairing the first cluster with a second cluster in the replication network, wherein second nodes of the second cluster are mapped to the first nodes of the first cluster;
performing inter-cluster replication validation checks, including checking connectivity:
from the first nodes to a gateway of the second cluster, and
from the second nodes to another gateway of the first cluster;
in response to the intra-cluster replication validation checks and the inter-cluster replication validation checks, generating replication validation output of the replication network; and
sending user interface data to a client device for presentation to a user, the user interface data based at least in part on the replication validation output.

18. The method of claim 17, further comprising:
performing the intra-cluster replication validation checks before performing the inter-cluster replication validation checks.

19. The method of claim 17, wherein the replication validation output includes pass-fail indications for at least one successful inter-cluster replication validation check and for at least one failed inter-cluster replication validation check.

20. The method of claim 17, wherein the replication validation output includes an indication of a maximum transmission unit (MTU) value associated with an inter-cluster replication validation check that succeeded.

* * * * *